United States Patent
Hassan et al.

(10) Patent No.: US 10,045,146 B2
(45) Date of Patent: Aug. 7, 2018

(54) WIRELESS DISPLAY THAT ACCESSES REMOTE RESOURCES FOR DISPLAY DATA

(71) Applicant: Microsoft Corporation, Redmond, WA (US)

(72) Inventors: Amer Hassan, Kirkland, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 14/146,676

(22) Filed: Jan. 2, 2014

(65) Prior Publication Data

US 2015/0187086 A1    Jul. 2, 2015

(51) Int. Cl.
    *G06T 7/20*     (2017.01)
    *H04W 4/00*     (2018.01)
(52) U.S. Cl.
    CPC ................... *H04W 4/008* (2013.01)
(58) Field of Classification Search
    CPC ................ G06T 7/20; H04W 76/02
    USPC ............................................... 345/520
    See application file for complete search history.

(56) References Cited

U.S. PATENT DOCUMENTS

| | | | |
|---|---|---|---|
| 6,223,188 B1 | 4/2001 | Albers et al. | |
| 8,195,768 B2 | 6/2012 | Vaughan et al. | |
| 8,515,336 B2 | 8/2013 | Collins et al. | |
| 2005/0010697 A1 | 1/2005 | Kinawi et al. | |
| 2006/0277481 A1 | 12/2006 | Forstall et al. | |
| 2010/0131847 A1 | 5/2010 | Sievert et al. | |
| 2010/0162127 A1* | 6/2010 | Uchino ............ | G06F 3/1454 715/740 |
| 2010/0235473 A1* | 9/2010 | Koren et al. ........... | 709/219 |
| 2010/0257449 A1 | 10/2010 | Lieb et al. | |
| 2010/0318916 A1 | 12/2010 | Wilkins | |
| 2012/0005269 A1* | 1/2012 | Janssen et al. ........ | 709/203 |
| 2012/0147268 A1* | 6/2012 | Hassan et al. ......... | 348/552 |
| 2013/0238702 A1* | 9/2013 | Sheth et al. ........... | 709/204 |
| 2014/0052872 A1* | 2/2014 | Varoglu et al. ........ | 709/231 |
| 2015/0179143 A1* | 6/2015 | Subramaniam et al. | 345/2 |

* cited by examiner

*Primary Examiner* — Shivang Patel
(74) *Attorney, Agent, or Firm* — Patent GC LLC (57) ABSTRACT

Problems of bandwidth utilization and delay, with a computer having a wirelessly connected display, are addressed by having the computer instruct a display device to access content from remote resources and combine that content with content processed locally at the computer and sent to the display device. The display device includes a processor, or display computer, associated with a display. When the computer transmits data to the display device, the data includes information indicating the resource, such as a server accessible over a computer network, which stores the content to be displayed. The processor associated with the display uses this information to access the content directly from its resource. The processor associated with the display can be embedded in the housing for the display or can be housed in a separate housing that is electrically connected directly to the display.

20 Claims, 6 Drawing Sheets

WIRELESS DISPLAY THAT ACCESSES REMOTE RESOURCES FOR DISPLAY DATA

BACKGROUND

Large wireless displays can display information from a computer, typically for use with a group of people. In a typical application, a computer is connected to a wireless display using a wireless communication protocol over a wireless connection. The computer then reads display data from a video memory and transmits the display data to the wireless display over the wireless connection using the wireless communication protocol.

The computer may have an application that processes the display data to reduce the amount of data that is transmitted to the wireless display. Using a variety of techniques, such applications compare current display data to previously sent display data and attempt to transmit only the data that has changed.

Even with an application that processes the display data prior to transmission, transmission of display data consumes a significant amount of available bandwidth on the wireless connection and internally in the computer. Additionally, there can be a significant delay between updating data on a computer and receipt and display of updated display data on an associated wireless display.

These problems are exacerbated when the computer accesses content from a source remote from the computer, then processes that content, and then displays it. For example, consider a presentation that is stored in remote storage service. Consider that this presentation further includes references to additional content such as graphics and video that are stored in yet other locations, such as video that is posted on the internet. In such a case, there are delays both in accessing and rendering the content locally on the computer and then in transmitting the display data to the display.

SUMMARY

This Summary is provided to introduce a selection of concepts in a simplified form that are further described below in the Detailed Description. This Summary is intended neither to identify key or essential features, nor to limit the scope, of the claimed subject matter.

Problems of bandwidth utilization and delay, with a computer having a wirelessly connected display, are addressed by having the computer instruct a display device to access content from remote resources and combine that content with content processed locally at the computer and sent to the display device. The display device includes a processor, or display computer, associated with a display. When the computer transmits data to the display device, the data includes information indicating the resource, such as a server accessible over a computer network, which stores the content to be displayed. The processor associated with the display uses this information to access the content directly from its resource. The processor associated with the display can be embedded in the housing for the display or can be housed in a separate housing that is electrically connected directly to the display. The connection between the computer and the wireless display device can be, for example, a Wi-Fi Direct interface.

In one implementation, the computer identifies content to be displayed that is accessed from a remote resource and whether authentication parameters are used to access that content. The resource identifier and any authentication parameters are embedded in data sent in one or more messages from the computer to the wireless display. The computer otherwise sends one or more messages with the local content to the wireless display.

The wireless display decodes data embedded in messages that are received from the computer. The data can include resource identifiers for publicly accessible content available on servers on a computer network. The data also can include authorization parameters for accessing private content accessible from servers on a computer network. The data also includes the local content from the computer.

Accordingly, in one aspect, a computer identifies content from a first resource remote from a computer, and identifies content in storage locally connected to the computer. The computer transmits a resource identifier and display coordinates for the content from the first resource to a display device wirelessly connected to the computer. The computer also transmits the content from local storage to the display device.

Accordingly, in another aspect, a display device receives data over a wireless connection from a computer indicating a resource identifier for a first resource remote from the display device and display coordinates for content from the first resource. The display device also receives display content over the wireless connection from the computer. The display device requests the content from the first resource, and combines the content from the first resource and the display content from the computer. The combined content is then displayed.

Accordingly, in another aspect, a computer system includes such a computer and display device interconnected over a wireless connection.

Accordingly, in another aspect, a protocol for communicating information to a display device includes messages transmitting a resource identifier for a first resource remote from the display device and display coordinates for content from the first resource, and other display content.

The foregoing aspects can be embodied as a computer-implemented process, a computer or device, or an article of manufacture, such as a computer storage medium having computer program instructions stored on the computer storage medium which, when processed by a processing device, instruct the processing device to perform a computer-implemented process or configure a computer.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section describes an example operating environment in which a computer is connected to a wireless display.

Figure 1:
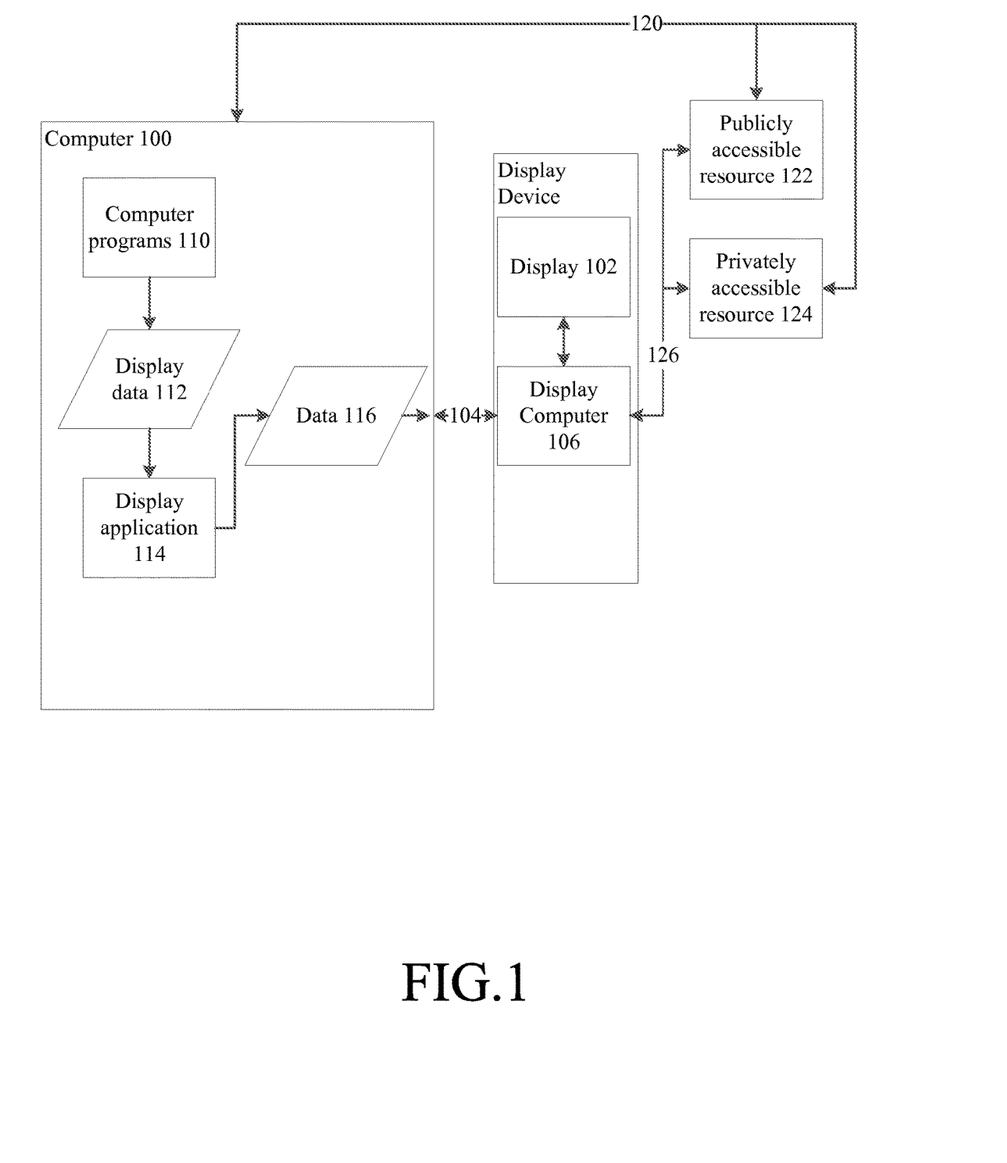
FIG. 1 is a block diagram of an example operating environment in which a computer is connected to a wireless display and remote resources.

Referring to FIG. 1, a computer system includes a computer 100 connected to a display device through a wireless network connection, illustrated at 104. A computer 100 can be any computer, such as described in connection with FIG. 6 below. The display device includes a display 102, which can be any conventional display technology that connects to a computer, such as a computer monitor or television. The display device also includes a display computer 106, which also can be implemented as described below in connection with FIG. 6. The display computer can be either built into the same housing as the display or in a separate housing yet is directly electrically connected to the display. The combination of display 102 and display computer 106 is called a "display device" or "wireless display" herein. The wireless connection between the display device and the computer 100 can be implemented in any way that conventionally is used to allow two computing devices to communicate wirelessly, an example of which is Wi-Fi Direct. In general, both the computer 100 and the display device have a communication interface allowing them to communicate with each other wirelessly.

The computer 100 includes one or more computer programs 110 that generate display data 112 for display on an output device. An example of such a computer program is an application, such as a presentation application in which a user defines slides which can include various media data such as text, graphics, images and video. Another example of such a computer program is an operating system that provides the primary display for a graphical user interface for the computer, such as a "desktop" display. Typically, a computer 100 has a local display device (not shown) that is directly electrically connected to the computer 100, to which the computer can direct the display data 112.

When the computer 100 is wirelessly connected to the display device, the computer 100 can be configured to direct display data 112 to the display 102. When the display data 112 is directed to the display 102, a display application 114 receives and processes the display data, and generates data 116 for transmission to the display device. The display device receives data 116, which is processed in the display computer 106 for display on the display 102.

How the display application 114 and display computer 106 of the wireless display cooperate to direct display data 112 to the display 102 will now be described in more detail.

In general, the display application 114 processes the display data 112 to determine whether the display data 112 includes data from a resource 122 that is remote from the computer 100, such as data that is stored on storage or other resource accessible over a computer network 120. In particular, the display application 114 identifies the remote resource, the data to be accessed on the remote resource, and any credentials to be used to authorize access to the data. This information can include, for example, a uniform resource identifier (URI), user name and password. Such credentials are optional and depend on the resource being accessed. The system can be designed to handle publicly accessible resources 122 and privately accessible (using authentication) resources 124. The display application 114 also generates image data using any other data that is otherwise not determined to be from a remote resource. The display application sends the generated image data and the information about the data from remote resources to the display device.

The display device, using the display computer 106, receives the generated image data and the information about the data from remote resources from the computer 100. The display computer 106 accesses the data from the remote resources 122 and 124 using the received information over a computer network 126. The computer 106 acknowledges to computer 100 that the data on the remote resources are accessible. The output for the display 102 is generated from both the image data received from the computer 100 and the image data generated from the data from the remote resources.

Having the display device receive data from remote resources, instead of through the computer 100, reduces bandwidth utilization over the wireless connection 104 between the computer 100 and the display device. Transmission delays and battery power usage also are reduced.

A detailed example implementation of such a system will now be described in connection with FIGS. 2-6. In this example, the Wi-Fi Direct protocol is used to connect a tablet computer to a smart wireless display, i.e., a display with built-in computer, over a wireless connection. Both the computer and the wireless display also are connected to a computer network, through which they can connect to remote resources, such as a server computer, with storage. Such remote resources can include both private resources, with authentication, and public resources, without authentication.

Figure 2:
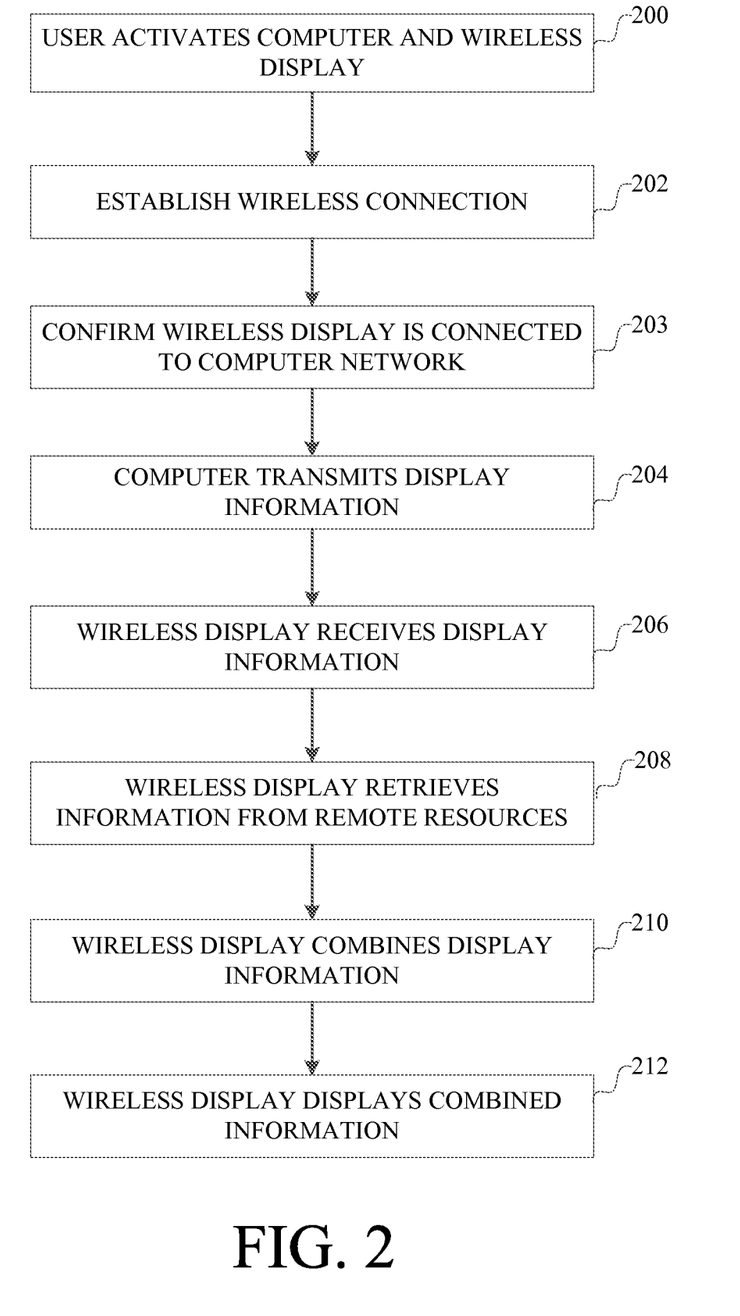
FIG. 2 is a flow chart describing operation of such an environment.

A flowchart describing an example process for setting up the system in this example implementation will now be described in connection with FIG. 2.

A user first activates 200 both the computer and the wireless display. After both devices are activated, a wireless connection can be established 202. For example, a Wi-Fi Direct connection can be established using the conventions defined by that protocol. After a connection is established between the devices, with a Wi-Fi Direct connection, the computer can confirm 203 that the wireless display is capable of accessing the internet. The computer then can begin broadcasting packets of information, some of which indicate information to be displayed by the display. Such packets, in Wi-Fi Direct, are called beacon packets.

The computer then periodically transmits 204 display information, including locally generated data and references to content on remote resources, to the wireless display. The wireless display receives 206 this display information. The wireless display retrieves 208 the information from the remote resources. Information from the remote resources is combined 210 with the display data from the computer, and displayed 212 on the wireless display.

A more detailed explanation of an example implementation of the operations on the computer will now be described in connection with FIG. 3.

Figure 3:
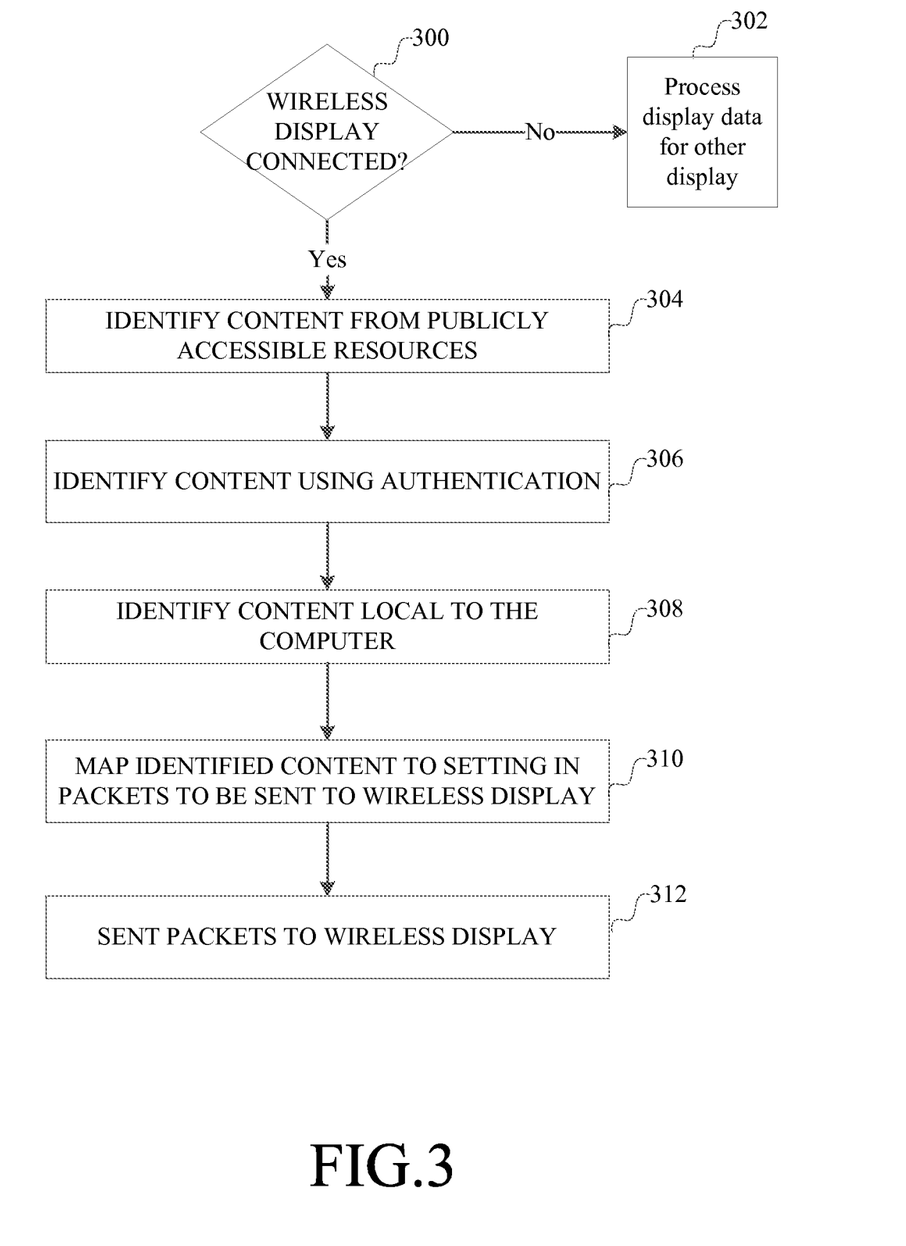
FIG. 3 is a flow chart describing an example implementation of how a computer processes data for transmission to a wireless display.

FIG. 3 illustrates an example process on a computer for managing the interaction between the computer and a wireless display. Typically, a user can connect the computer to the wireless display in a number of different ways, and at various points in time during its operation. For example, a user can connect a computer to a display before, after or during the activation of an application that displays data. A process that directs display data to the wireless display may be activated at any time before, during or after an application begins generating display data. Thus, while the computer is running and displaying data, before displaying any next frame, the process first checks 300 if the wireless display is connected to the computer. If the wireless display is not connected, then the display data is processed 302 by other means, and can be directed to a locally connected display. If the wireless display is connected, but is not connected to a computer network for accessing remote resources, then the display data also is processed by other means, effectively combining local content and remote content at the computer 100 and sending the combined content to any locally connected display.

If the wireless display is connected, then for the current frame of display data, content from remote sources is identified. For example, in any process that is rendering data for display, if a remote resource is detected as a source of content, then the data for accessing that resource is collected. It is possible to distinguish among different types of remote sources. In one implementation, content from a publicly accessible resource, such as a server accessible over the internet, is identified 304. Any content from a resource that uses authentication, such as a cloud-based storage service or other server accessible over a computer network, also is identified 306. Finally, the remaining content is local to the computer, and also is identified 308 and rendered at the computer 100. The identified content is mapped 310 into settings in packets, which are then sent 312 from the computer to the wireless display.

Figure 4:
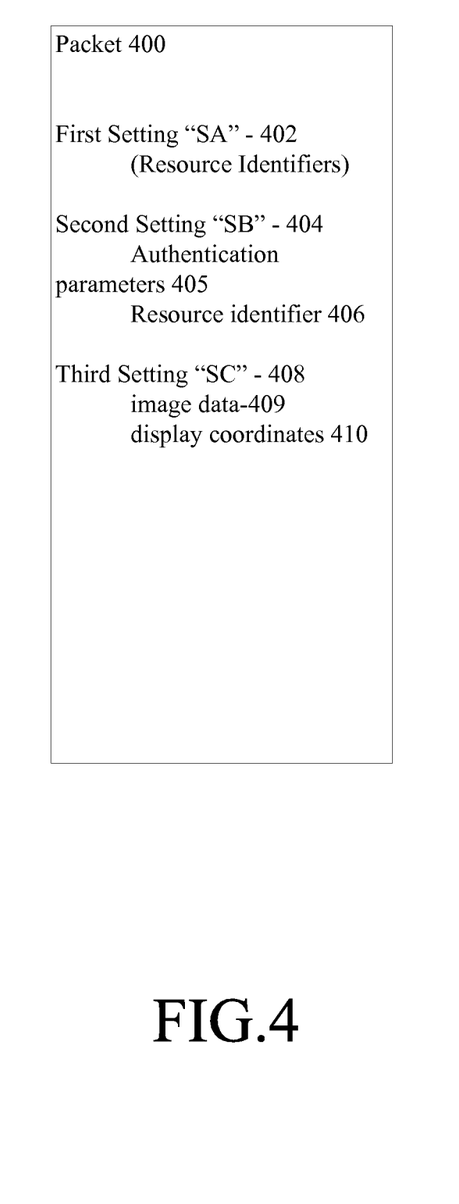
FIG. 4 is a diagram of an example data structure for a packet of data sent from a computer to a wireless display

An example implementation of a packet for transmitting data from the computer to the wireless display is shown in FIG. 4. Such a packet 400 can include a variety of information not shown in FIG. 4 that ensures the packet is conforming to the communication protocol being used between the computer and the wireless display. In addition, the packet includes a first setting 402, called "sa", embeds resource identifiers, also called links, to the publicly accessible resources. A second setting 404, called "sb", includes the authentication parameters 405 and resource identifiers 406 for the remote resources using authentication. The third setting 408, "sc", includes the data describing the remaining content, which can include image data 409 and display coordinates 410 for content specified by settings "sa" and "sb". The display coordinates indicate where in the image data 409 the content from the remote resources should be placed. In another implementation, display coordinates can be provided for each resource identifier 402 or 406.

Figure 5:
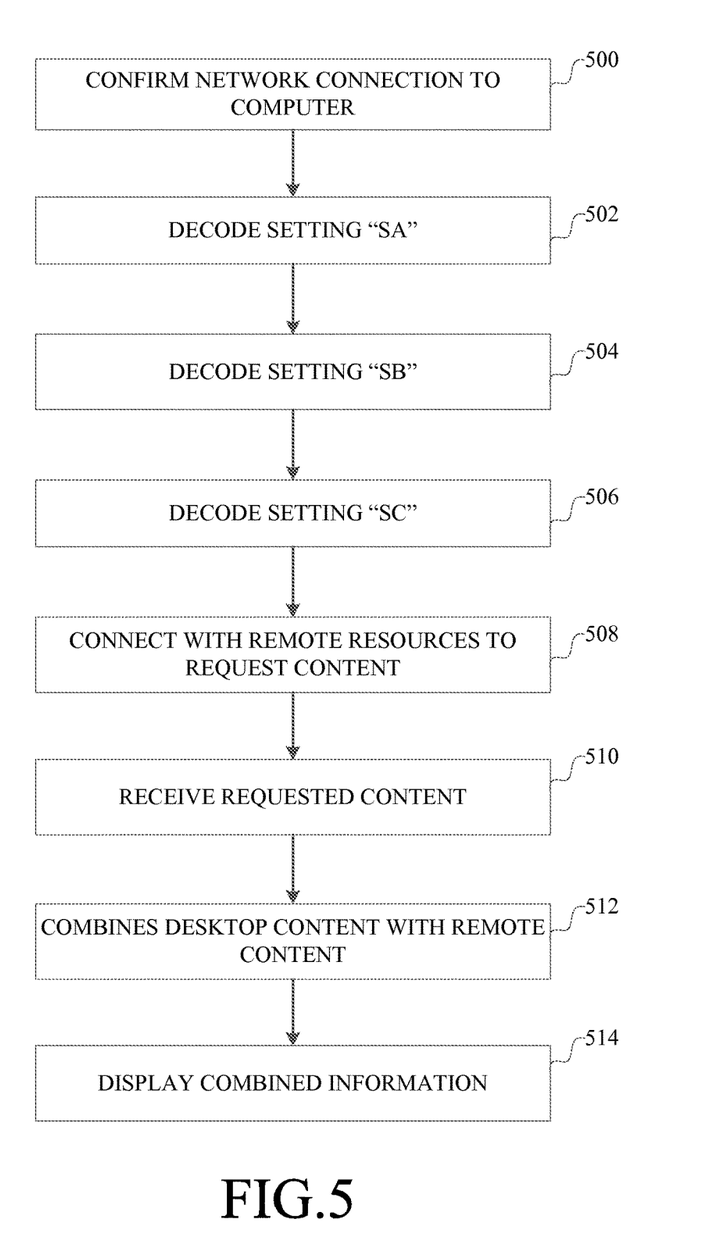
FIG. 5 is a flow chart describing an example implementation of how a wireless display processes data received from a computer.

Turning now to FIG. 5, at the wireless display, in response to a packet that is received, the wireless display first confirms 500 to the computer that the wireless display is connected to a computer network. A processor associated with the wireless display decodes 502 the setting "sa" in the received packet to obtain any link data for remote resources. The processor also decodes 504 the setting "sb" in the received packet to obtain any authentication and resource identifier data for authenticated remote resources. The locations in the display for the content retrieved from those resources are decoded 506 from setting "sc". The processor associated with the display then connects 508 to any remote resources and requests the content. The wireless display then receives 510 the requested content from the remote resources, storing the content in local memory of the wireless display. The processor then combines 512 the desktop content from the received packet with the content from local memory that has been retrieved from remote resources, and displays 514 the combined content on the display.

In the example implementation describe above, the computer determines when to check for changes in the display content, and then scans the displayed content for local and remote content (which can include public and private content). The wireless display checks during every beacon period to determine whether any settings (e.g., settings sa, sb and sc described above) have changed.

Figure 6:
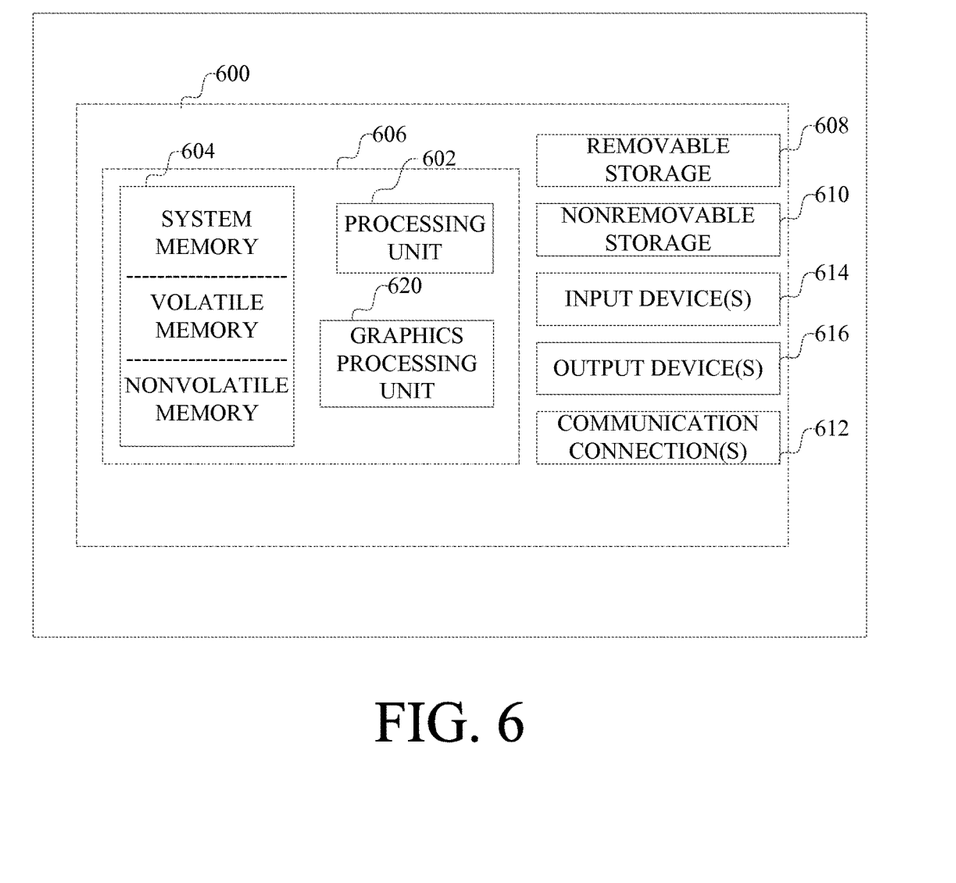
FIG. 6 is a block diagram of an example computer with which components of such a system can be implemented.

Having now described an example implementation, FIG. 6 illustrates an example computer in which such techniques can be implemented. This is only one example of a computer and is not intended to suggest any limitation as to the scope of use or functionality of such a computer. The following description is intended to provide a brief, general description of such a computer. The computer can be any of a variety of general purpose or special purpose computing hardware configurations. Examples of well-known computers that may be suitable include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, network PCs, minicomputers, mainframe computers, distributed computing environments that include any of the above systems or devices, and the like.

With reference to FIG. 6, an example computer 600, in a basic configuration, includes at least one processing unit 602 and memory 604. The computer can have multiple processing units 602. A processing unit 602 can include one or more processing cores (not shown) that operate independently of each other. Additional co-processing units, such as graphics processing unit 620, also can be provided. Depending on the configuration and type of computer, memory 604 may be volatile (such as RAM), non-volatile (such as ROM, flash memory, etc.) or some combination of the two. This configuration is illustrated in FIG. 6 by dashed line 606. The computer 600 also may include additional storage (removable and/or non-removable) including, but not limited to, magnetic or optical disks or tape. Such additional storage is illustrated in FIG. 6 by removable storage 608 and non-removable storage 610.

A computer storage medium is any medium in which data can be stored in and retrieved from addressable physical storage locations by the computer. Computer storage media includes volatile and nonvolatile, removable and non-removable media. Memory 604, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 600 may also contain communications connection(s) 612 that allow the device to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 612 are devices, such as a network interface or radio transmitter, that interface with the communication media to transmit data over and receive data from communication media.

Computer 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented using one or more computer programs processed by one or more processing units in the computer. A computer program includes computer-executable instructions and/or computer-interpreted instructions, which instructions are processed by one or more processing units in the computer. Generally, such instructions define routines, programs, objects, components, data structures, and so on, that, when processed by a processing unit, instruct the processing unit to perform operations on data, or configure the computer to include various devices or data structures. This computer system may be practiced in distributed computing environments where tasks are performed by remote processing devices that are linked through a communications network. In a distributed computing environment, computer programs may be located in both local and remote computer storage media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. § 101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer system comprising:
   a computer;
   a display device; and
   a wireless connection between the computer and the display device;
   wherein the computer includes a first processor configured to:
      identify, in display data to be transmitted to the display device, first content accessed from a first resource remote from the computer;
      identify, in the display data, second content in storage locally connected to the computer;
      locally render the identified second content to provide image data;
      transmit packets at a beacon period, over the wireless connection to the display device, wherein each packet includes settings comprising a resource identifier for the first content, display coordinates for displaying the first content from the first resource relative to the image data for the locally rendered second content, and the image data for the locally rendered second content from local storage;
   wherein the display device has a second processor configured to:
      in response to a received packet with changed settings, update settings stored for the resource identifier, the image data and the display coordinates;
      transmit a request over a computer network to the first resource, the request including the resource identifier from the stored settings;
      receive the first content from the first resource over the computer network;
      render the first content locally at the display device; and
      combine the rendered first content from the first resource and the image data for the second content received from the computer, based on at least the display coordinates from the stored settings, and cause the combined content to be displayed on the display device.

2. The computer system of claim 1, wherein the computer is further configured to:
   identify authentication parameters for accessing additional content from a second resource remote from the computer; and
   transmit, over the wireless connection to the display device, an additional resource identifier, the authentication parameters, and display coordinates for the additional content from the second resource.

3. The computer system of claim 1, wherein the display device is connected to the computer via a Wi-Fi Direct compliant wireless connection.

4. The computer system of claim 1, wherein to transmit packets at the beacon period, the computer is further configured to:
   transmit a beacon packet for the wireless connection, wherein the beacon packet includes the settings including the resource identifier for the first content, the display coordinates, and the image data for the second content;
   and wherein the second processor is further configured to, in response to each beacon packet, store the settings for the resource identifier, the image data and the display coordinates and check, during a beacon period, to determine whether any of the settings have changed, and perform the transmitting of the request, and the combining of the rendered first content and the image data, based on the settings for the resource identifier, the image data and the display coordinates.

5. The computer system of claim 1, wherein the computer is further configured to detect whether the display device is connected to the computer network for accessing the first resource.

6. The computer system of claim 5, wherein, in response to detecting the display device is not connected to the computer network for accessing the first resource, the computer is configured to combine the first content from the first resource and the second content from the local storage, and transmits the combined content for display on the display device.

7. A process for a display device to generate and present display data from a computer based on data received from the computer over a wireless connection, comprising:
   the display device receiving packets transmitted at a beacon period over the wireless connection from the computer, wherein a packet comprises settings including data indicating a resource identifier for first content from a first resource remote from the display device and remote from the computer, display coordinates for displaying the first content from the first resource relative to image data for second content, and the image data for the second content rendered at the computer;
   a processor of the display device, in response to a received packet with changed settings, updating settings stored for the resource identifier, the image data and the display coordinates;
   the processor of the display device transmitting a request over a computer network to the first resource, the request including the resource identifier from the stored settings;
   the processor of the display device receiving the first content from the first resource over the computer network;
   the processor of the display device rendering the first content locally at the display device; and
   the processor of the display device combining the rendered first content from the first resource and the image data for the second content received from the computer based on at least the display coordinates from the stored settings; and
   the processor of the display device causing the combined content to be displayed on the display device.

8. The process of claim 7, further comprising:
   receiving additional data over the wireless connection from the computer, the additional data including a second resource identifier for a second resource remote from, and accessible over a computer network by, the display device, authentication parameters for accessing the second resource, and additional display coordinates for additional content from the second resource.

9. The process of claim 8, wherein combining further comprises:
   combining the additional content from the second resource with the combined content based on at least the additional display coordinates.

10. The process of claim 7, wherein the display device is connected to the computer via a Wi-Fi Direct compliant wireless connection.

11. The process of claim 7, wherein the receiving packets transmitted at the beacon period comprises receiving a beacon packet for the wireless connection, wherein the beacon packet comprises data indicative of the settings, and the process further comprises:
   the processor for the display device, in response to each beacon packet, storing the settings for the resource identifier, the image data and the display coordinates;
   the processor of the display device checking during a beacon period to determine whether any of the settings have changed; and
   the processor of the display device performing the transmitting of the request, and the combining of the rendered first content and the image data, based on the settings.

12. The process of claim 7, further comprising:
   the display device communicating to the computer whether the display device is connected to the computer network for accessing the first resource.

13. The process of claim 12, further comprising: in response to the display device communicating to the computer that the display device is not connected to the computer network for accessing the first resource, display device receiving, from the computer, the second content from the computer and the first content from the first resource.

14. A display device comprising:
   a display;
   a computing device having a communication device for connection with a computer network and a wireless connection device for establishing a wireless connection with a host computer, the computing device generating and presenting display data from the host computer by using a computer program stored in memory and executed by a processor to:
   receive packets transmitted at a beacon period through the wireless connection device over the wireless connection from the host computer, wherein each packet comprises data indicating a resource identifier for first content stored on a first resource remote from the display device and remote from the host computer, display coordinates for displaying the first content from the first resource relative to image data for second content, and the image data for the second content previously rendered by the host computer;
   in response to a received packet with changed settings, update settings stored for the resource identifier, the image data and the display coordinates;
   transmit a request over the computer network through the communication device to the first resource, the request including the resource identifier from the stored settings;
   receive the first content from the first resource over the computer network through the communication device;
   render the first content locally at the display device;
   combine the rendered first content and the image data for the second content previously rendered by the host computer using the processor and based on at least the display coordinates from the stored settings; and
   display the combined content on the display.

15. The display device of claim 14, wherein the computing device executes the computer program further to:
   receive data through the wireless connection device over the wireless connection from the host computer, a resource identifier for additional content from a second resource remote from and accessible over a computer network by the display device, and authentication parameters for the display device to access the second resource, and additional display coordinates for the additional content from the second resource.

16. The display device of claim 15, wherein combining the first content and the second content further includes combining the first content from the first resource, the additional content from the second resource and the second content from the host computer based on at least the display coordinates for the first content and the additional display coordinates for the additional content.

17. The display device of claim 14, wherein the wireless connection device comprises a Wi-Fi Direct compliant wireless connection device.

18. The display device of claim 14, wherein receiving packets transmitted at the beacon period comprises receiving a beacon packet for the wireless connection, wherein the beacon packet comprises data indicative of the settings, and wherein the computing device of the display device is further operative to:

in response to each beacon packet, store the settings for the resource identifier, the image data and the display coordinates;

check during a beacon period to determine whether any of the settings have changed; and perform the transmitting of the request and the combining of the rendered first content and the image data based on the settings.

19. The display device of claim 14, wherein the computing device executes the computer program further to: communicate to the host computer whether the display device is connected to the computer network for accessing the first resource.

20. The display device of claim 19, wherein the computing device executes the computer program further to, in response to a determination that the display device is not connected to the computer network to access the first resource, receive, from the host computer, the first content from the first resource.

* * * * *